United States Patent [19]

Utting

[11] Patent Number: 5,509,014

[45] Date of Patent: Apr. 16, 1996

[54] WIDE AREA CELLULAR RADIO SYSTEM

[75] Inventor: Ross Utting, Eastwood, Australia

[73] Assignee: Alcatel N.V., Netherlands

[21] Appl. No.: 335,647

[22] Filed: Nov. 8, 1994

[30] Foreign Application Priority Data

Nov. 15, 1993 [AU] Australia ........................ P2427

[51] Int. Cl.⁶ .................................... H04Q 7/36
[52] U.S. Cl. .................. 370/95.3; 455/33.3; 455/33.4
[58] Field of Search ........................ 370/50, 95.1, 95.3, 370/108; 455/33.1, 33.2, 33.3, 33.4

[56] References Cited

U.S. PATENT DOCUMENTS

| 4,947,452 | 8/1990 | Hattori et al. | 455/33.3 |
| 5,280,472 | 1/1994 | Gilhousen et al. | 370/18 |
| 5,293,380 | 3/1994 | Kondo | 370/108 X |
| 5,381,443 | 1/1995 | Borth et al. | 370/95.1 X |
| 5,396,645 | 3/1995 | Huff | 455/33.3 X |

FOREIGN PATENT DOCUMENTS

| 0192809 | 9/1986 | European Pat. Off. . |
| 0458768 | 11/1991 | European Pat. Off. . |
| 0492531 | 7/1992 | European Pat. Off. . |

*Primary Examiner*—Melvin Marcelo
*Attorney, Agent, or Firm*—Ware, Fressola, Van Der Sluys & Adolphson

[57] ABSTRACT

The range of a digital cellular radio cell is extended by providing first and second communication paths (RXA, RXB) in which the second communication path receives signals from outside the range (D1) of the first path, the synchronization of the second path signals being delayed by an amount equal to the additional transmission delay ($T_1$). Each communication path is provided with its own antenna (A,B).

5 Claims, 3 Drawing Sheets

WIDE AREA CELLULAR RADIO SYSTEM

TECHNICAL FIELD

This invention relates to an arrangement for extending the range of radio coverage in a TDMA system. The invention will be described with reference to a digital GSM cellular-radio system using TDMA, but it is applicable to TDMA systems generally.

Radio TDMA systems are particularly useful where a central receiver deals with a plurality of remote transmitters. However, the distance between the remote transmitters and the central receiver introduces propagation delay which varies in direct proportion to the distances the mobile is located from the base station.

To prevent adjacent transmissions from remote transmitters overlapping in time due to propagation delay it is necessary to introduce guard bands between remote transmitter transmission. Further, to maximise information throughput it is well known that each individual remote transmitter can be instructed to advance the starting time of its transmission in order to compensate for the propagation delay. If this is done, then the guard band between remote transmitter transmissions can be reduced.

BACKGROUND OF THE INVENTION

Cellular-radio telephone systems divide a coverage area into a plurality of contiguous cells each served by a base station. In urban areas, the coverage of each cell may be only a few kilometers in diameter, cell size being reduced as the communication traffic density increases.

As the traffic density decreases the size of the cells can be increased. The protocol adopted by GSM permits mobiles to advance their timing by a maximum of 63 communication bits equivalent to approximately 35 kilometers. Once the mobile exceeds this distance it cannot be instructed to advance its timing any further. Consequently the base station receiver will eventually be unable to correlate the received mobile transmission once the timing advance becomes too great. In some GSM systems, this may be only 4–6 bits greater than the maximum timing advance (63 bits).

An option available with some communication systems including GSM is the provision of a diversity receive antenna at the base station which will receive signals from a different direction from the main beam antenna.

In particular, in some systems the diversity advantage is applied after demodulate and decoding. This is referred to as baseband soft combining and implies that two separate receiver chains are maintained in the base station from the RF input until baseband recombination.

SUMMARY OF THE INVENTION

This invention proposes an arrangement for increasing the maximum range of a TDMA communication system having antenna means providing a first coverage area having a first radius, the first radius being equal to or less than the maximum TDMA radius, and a second coverage area having a radius greater than the first radius, wherein signals received from the first coverage area are processed in a first receiver, wherein the signals received from the second coverage area are processed in a second receiver with a delay with respect to the signals processed by the first receiver.

Preferably the delay is equal to the transmission time over the distance of the first radius.

Preferably a first antenna provides coverage of the first coverage area, and a second antenna provides coverage of the second coverage area.

BRIEF DESCRIPTION OF THE DRAWINGS

The invention will now be described with reference to the accompanying drawings, in which.

BEST MODE FOR CARRYING OUT THE INVENTION

Figure 1:
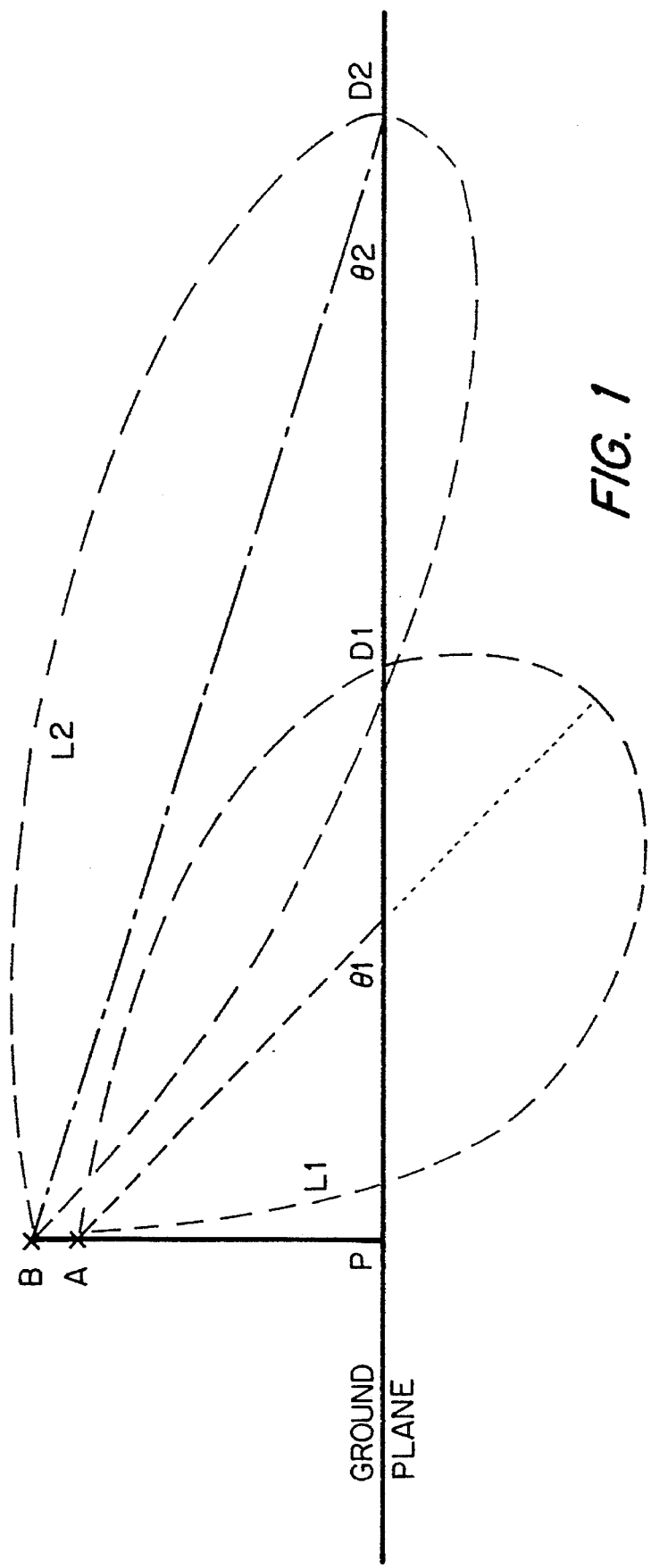
FIG. 1 shows the radiation pattern of a pair of antennae arranged in accordance with an embodiment of the invention.

With reference to FIG. 1, a first antenna A has a main lobe L1 the centre line of which intersects the earth plane at an angle O1, and a second antenna B has a main lobe L2 whose centre line intersects the earth plane at an angle O2. The outer edge of L1 intersects the earth plane at D1, and the inner edge of L2 intersects the earth plane at the same point. The outer edge of L2 intersects the earth plane at D2.

Each lobe L1 and L2 may be assumed to have rotational symmetry about the antenna pole P on which the antennae A and B are mounted, thus L1 describes a circular coverage area having a radius of PD1 centered on the pole at ground level, and L2 describes a coverage area having an annular shape with internal radius of PD1 and an external radius of PD2.

It is assumed that D1 is at the maximum distance from antenna A permitted by the maximum transmission delay allowable by the TDMA system used in conjunction with antenna A. In GSM this corresponds to a distance of 35 km. As PD1>>the height of the antenna A, the maximum distance is~PD1.

With reference to L2 it is preferred that the centre line of the beam intersects the ground plane to ensure maximum sensitivity at the most distant point from the antenna B.

If PD2=2 PD1, then the transmission time for a signal from D2 to B is twice the transmission time from D1 to A.

Figure 2:
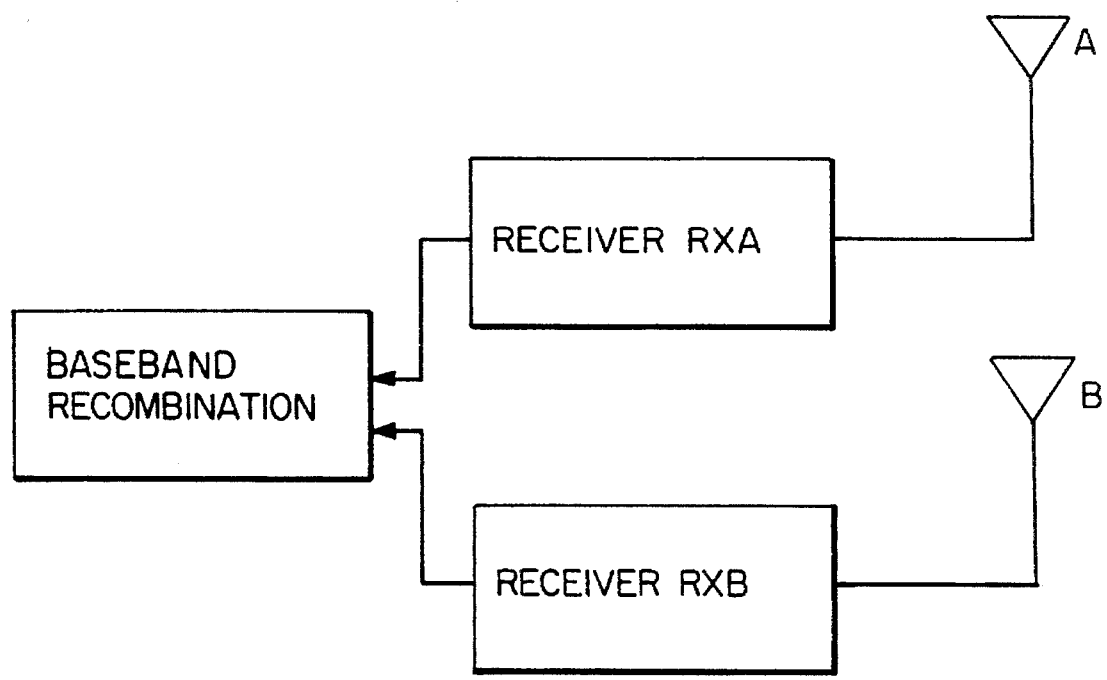
FIG. 2 shows a block diagram of an arrangement embodying the invention.

With reference to FIG. 2, signals received by antenna A are applied to receiver RXA, and signals received by antenna B are applied to receiver RXB. RXA samples the signals received from antenna A to attempt to establish correlation.

Correlation is the process of combining a known pseudo random bit stream (training sequence) with a second bit stream also containing the training sequence. The second bit stream may be errored and the starting point of the training sequence is unknown. Correlation is achieved when the starting point of the training sequence in the second bit stream is found.

If the transmission delay is greater than permitted by the protocol, it may be the case that RXB is able to establish correlation because RXB is arranged to sample the signals from B after a delay equal to the 35 km transmission time.

The GSM base station continually monitors the delay in the response from the mobile station and periodically sends an instruction to the mobile station to advance its transmission by an integer number of bits (0–63). There is a maximum of 63 bits allowed in the GSM system for this purpose so that if the delay exceeds this 63 bit period (approx. 200 mS), the base station will be unable to correlate the received signals and the link will be dropped.

However, in the technique proposed in this invention, the correlation process is delayed in the second receiver for the 63 bit period, so that the second receiver will be able to maintain correlation and the base station will be able to adjust the mobile's transmission by an additional 63 bit periods, effectively doubling the range of the cell.

Figure 3:
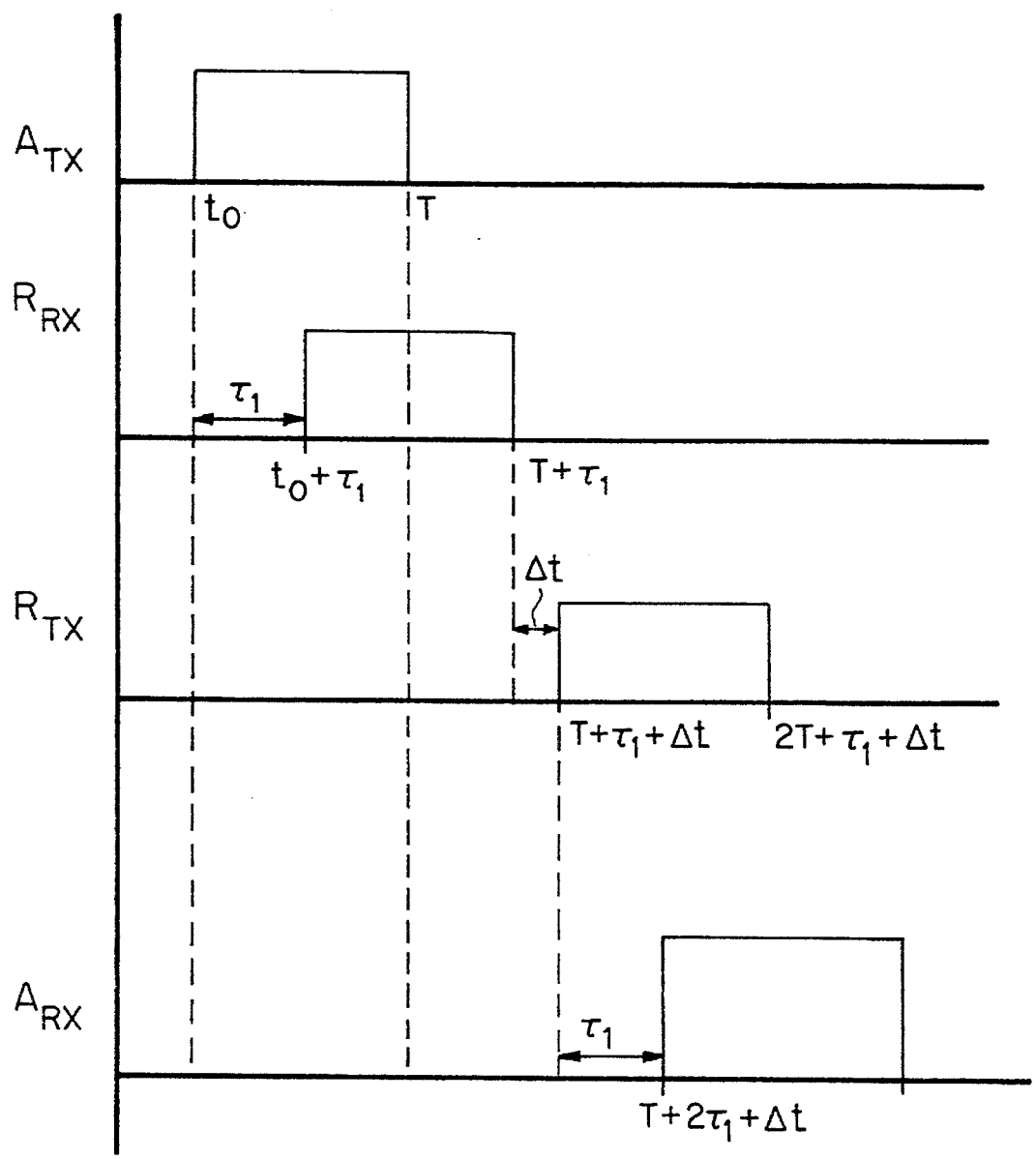
FIG. 3 shows the timing of an exchange of signals between a remote station and a base station.

FIG. 3 illustrates the time delay between a transmission burst from antenna A ($A_{TX}$) and the reception of a response by antenna A ($A_{RX}$) from a distant antenna R.

In FIG. 3 $A_{TX}$ shows the transmission of a burst of duration T starting at $t_o$. $R_{RX}$ shows the reception of this burst at remote antenna R after a delay Thus the end of the burst is received at R after $T+T_1$, referred to $t_o$.

After an internal delay $\Delta t$, the transmitter at R transmits a response ($R_{TX}$) commencing at $T+T_1+\Delta t$. The leading edge of this response is received at antenna A ($A_{RX}$) after a further delay $T_1$, i.e. at time $T+2T_1+\Delta t$ after $t_o$. $\Delta t$ may be approximately zero particularly if the burst is of known length.

The solution according to the invention permits a virtual doubling of the radius of the mobile station from the base station. By delaying at the base station the sampling of the more distant signals by an amount equal to the maximum permitted TDMA adjustment, the signals received from distances between 35 km and 70 km can be correlated and the link maintained.

While the invention has been described in the context of a GSM system using two antennae, the same technique can be applied to signals received from a single antenna.

The signals received from the single antenna are applied to a first receiver path and a second receiver path, in which the sampling of the second receiver path is delayed with respect to the sampling of the first receiver path so that the signals received from beyond the range of the signals accepted by the first receiver path may be correlated by the second receiver path.

However, the invention is particularly suited to application in a GSM system provided with a main beam antenna and receiver path, and a diversity beam antenna and receiver path. The antennae are set, according to an embodiment of the invention, to cover contiguous, concentric areas and the outer zone antenna signals are processed after a delay of about 200 mS.

A disadvantage of the present invention is that the distant signals may interfere with the next following time division channel.

The effects of this may be overcome by dynamically re-assigning remote calls to be part of a group of sequential channels carrying remote calls. Because processing of each of these channels is delayed by the same amount, they will not interfere with each other.

Alternatively if the system is lightly loaded the channel following a remote signal could be vacated.

Both these modifications can be implemented in the control software for the system.

A second disadvantage is that the call will be lost if the mobile station crosses the 35 km boundary.

As the mobile approaches the 35 km boundary the timing advance sent to the mobile will be either approximately 0 or 63 depending on the receiver.

A trigger must be initiated within the base station so that the timing advance is changed from 63–0 or 0–63 so that the alternate receiver is used by the base station.

The mobile must effectively be given a handover command so the new timing advance can be implemented successfully.

I claim:

1. An arrangement for increasing the maximum range of a base station in a TDMA communication system, the base station comprising:

antenna means providing a first coverage area having a first radius, the first radius being equal to or less than a maximum TDMA radius, and a second coverage area having a radius greater than the first radius, a first receiver for processing signals received from the first coverage area, and a second receiver for processing signals received from the second coverage area, wherein said second receiver delays processing of said signals received from the second coverage area, and wherein the length of the delay is selected such that signals received from the second coverage area are processed by the second receiver with a delay with respect to signals processed by the first receiver.

2. An arrangement as claimed in claim 1 wherein the delay is equal to the transmission time over the distance of the first radius.

3. An arrangement as claimed in claim 1 wherein said antenna means includes a first antenna which provides coverage of the first coverage area and a second antenna which provides coverage of the second coverage area.

4. An arrangement as claimed in claim 1 wherein said maximum TDMA radius is determined based on a maximum transmission delay allowable for the TDMA communication system.

5. A method of increasing the range of a base station in a TDMA communication system in which the timing of transmissions from mobile stations to the base station is adjustable within a range having a predetermined maximum duration which permits communication between the base station and mobile stations located within a first radius of the base station, the method including the steps of:

providing first receive means at the base station to receive transmissions from mobile stations within a first coverage area corresponding to the first radius, providing one or more additional receive means to receive transmissions from mobile stations within one or more additional coverage areas, each additional coverage area corresponding to one of the additional receive means, delaying the processing by a first of the additional receive means of transmissions received from the corresponding additional coverage area with respect to the processing by the first receive means of transmissions received from the first coverage area, the processing being delayed by an amount not greater than a predetermined maximum duration, and delaying the processing of transmissions received from each of the remaining additional coverage areas by each of the remaining additional receive means, if any, by progressively greater periods to provide concentric overlapping or contiguous coverage areas.

* * * * *